United States Patent
Allsop et al.

(10) Patent No.: US 7,891,832 B2
(45) Date of Patent: Feb. 22, 2011

(54) OUTDOOR LIGHT WITH POSITIONABLE SOLAR COLLECTOR

(75) Inventors: James D. Allsop, Bellingham, WA (US); Eivind Clausen, Bellingham, WA (US); Jamey J. Allsop, Bellingham, WA (US)

(73) Assignee: Allsop, Inc., Bellingham, WA (US)

( * ) Notice: Subject to any disclaimer, the term of this patent is extended or adjusted under 35 U.S.C. 154(b) by 375 days.

(21) Appl. No.: 12/118,608

(22) Filed: May 9, 2008

(65) Prior Publication Data

US 2008/0247155 A1 Oct. 9, 2008

Related U.S. Application Data

(63) Continuation-in-part of application No. 11/133,163, filed on May 18, 2005, now abandoned.

(51) Int. Cl.
*F21L 4/08* (2006.01)
*F21S 8/08* (2006.01)

(52) U.S. Cl. .................................. 362/153.1; 362/183

(58) Field of Classification Search ............... 362/153, 362/153.1, 183, 191
See application file for complete search history.

(56) References Cited

U.S. PATENT DOCUMENTS

| | | | |
|---|---|---|---|
| 1,881,594 A | 10/1932 | Hotchkin | |
| 3,193,229 A | 7/1965 | Stock | |
| 3,531,636 A | 9/1970 | Birch | |
| 3,762,082 A | 10/1973 | Mincy | |
| 4,823,241 A | 4/1989 | Trattner | |
| 5,055,984 A | 10/1991 | Hung et al. | |
| 5,149,188 A | 9/1992 | Robbins | |
| 5,410,458 A | 4/1995 | Bell | |
| 5,813,749 A | 9/1998 | Sheldon | |
| 6,060,658 A | 5/2000 | Yoshida et al. | |
| 6,152,582 A | 11/2000 | Klaus | |
| 6,517,217 B1 | 2/2003 | Liao | |
| 6,522,263 B2 | 2/2003 | Jones | |
| 6,686,701 B1 * | 2/2004 | Fullarton | 362/806 |
| D494,536 S | 8/2004 | Pu | |
| 6,830,058 B2 | 12/2004 | Li | |
| 6,851,823 B2 | 2/2005 | Bilotti | |
| 6,964,498 B2 | 11/2005 | Wu | |
| 2003/0098976 A1 | 5/2003 | Yamauchi | |

(Continued)

FOREIGN PATENT DOCUMENTS

BR 9805481 8/2000

(Continued)

*Primary Examiner*—David V Bruce
(74) *Attorney, Agent, or Firm*—Black Lowe & Graham PLLC (57) ABSTRACT

A solar powered lighting system provides a lighting element assembly having a lighting element and a diffuser that secures near the upper end of a support. A collector unit contains a solar cell and a coupler such as a clip-on clamp which allows the collector unit to be selectively attached to a desired support. The lighting system includes a battery electrically coupled to the solar cell of the collector unit and to the lighting element assembly using a wire such that the portion of the wire that extends from the collector unit to the lighting element assembly is of sufficient length to allow the collector unit to be selectively positioned on or remotely from the support.

17 Claims, 12 Drawing Sheets

U.S. PATENT DOCUMENTS

| | | |
|---|---|---|
| 2005/0083681 A1 | 4/2005 | Yeh |
| 2005/0146874 A1 | 7/2005 | Cech et al. |
| 2005/0248934 A1 | 11/2005 | Weiser et al. |
| 2006/0012978 A1 | 1/2006 | Allsop et al. |
| 2006/0139912 A1 | 6/2006 | Norton et al. |
| 2006/0227542 A1 | 10/2006 | Richmond |
| 2007/0159836 A1 * | 7/2007 | Huang et al. ............... 362/183 |

FOREIGN PATENT DOCUMENTS

| | | |
|---|---|---|
| CH | 611446 | 5/1979 |
| DE | 3635209 | 4/1988 |
| EP | 386811 | 9/1990 |
| EP | 1291834 | 3/2003 |
| EP | 1500870 | 1/2005 |
| JP | 11318218 | 11/1999 |
| JP | 2001230433 | 8/2001 |

* cited by examiner

OUTDOOR LIGHT WITH POSITIONABLE SOLAR COLLECTOR

PRIORITY CLAIM

This application is a continuation-in-part of U.S. patent application Ser. No. 11/133,163 filed May 18, 2005, the disclosure of which is incorporated herein by reference in its entirety.

FIELD OF THE INVENTION

This invention relates generally to outdoor lighting apparatus, and, more specifically, to solar powered outdoor lighting apparatus.

BACKGROUND OF THE INVENTION

Outdoor lighting can provide an important accent to any yard or garden. A gardener or landscaper may strategically place many lights in a landscape to illuminate walkways and to otherwise enhance the appearance of the landscape at night. Some lighting systems are designed to simply provide light while in others the lights themselves serve ornamental purposes even when they are not illuminated.

In many prior systems, lights are wired directly to an adjacent residence through underground power cables. However, underground cables require excessive labor to install and interfere with gardening and landscaping efforts, as they are dug up by tilling, planting, and the like. Other systems have used solar cells to collect electricity in batteries during daylight hours and then use the stored energy to power the lights at night. However, prior systems interfere with the purpose of the lighting system, which is principally aesthetic. The solar cells are prominently mounted to the top or sides of the lighting element and are therefore visible during daylight hours. As time passes, mineral deposits and fading often discolor the solar cell. Ultimately, the solar cell distracts from any ornamental qualities the lighting system was designed to have.

In view of the foregoing it would be an advancement in the art to provide a solar powered outdoor lighting system that may be prominently mounted without interfering with ornamental aspects of the lighting system and the surrounding landscape.

SUMMARY OF THE INVENTION

The present invention comprises a system for providing outdoor lighting including a support, a lighting element assembly, and a collector unit. The support is typically a vertical rod having the lower end thereof inserted in a soil substrate. The lighting element assembly is typically ornamental and contains a lighting element, such as an LED. The lighting element assembly secures to the support near the upper end thereof. The collector unit secures to the support offset a substantial distance from the lighting element assembly. In one embodiment, the distance between the lighting element assembly and collector unit is greater than or equal to approximately 40% of the length of the support.

The collector unit contains a solar cell and a battery. In typical applications the collector unit is positioned flush with or above foliage growing from the substrate supporting the lighting system. A light sensitive switch connects the lighting element to the battery and is operable to turn the lighting element on in low light conditions. The light sensitive switch typically mounts to the collector unit near the solar cell. The collector unit may be adjustably secured to the support such that its position and orientation relative to the support may be changed in order to store the lighting system or to improve solar power collection.

The lighting element assembly has a diffuser positioned over the lighting element to diffuse the light therefrom. In one embodiment, the diffuser is made of cracked glass to enhance visibility thereof. A support adapter secures the diffuser and lighting element to the support and has a diffuser receptacle, a lighting element seat, and a support receiver sleeve. The diffuser receptacle receives a portion of the diffuser to secure the diffuser to the support. In some embodiments, a threaded attachment secured to the diffuser directly engages a threaded region on the receptacle. Apertures may be formed in the diffuser receptacle to enable drainage of moisture built up within the diffuser.

The lighting element is positioned within the lighting element seat, which is located within the diffuser receptacle. The lighting element seat opens into the support receiver sleeve and provides a channel receiving a wire that extends from the collector unit to the lighting element. The support receiver sleeve receives the end of the support to secure the support adapter thereto. In some embodiments, a lighting element shield may be positioned over the lighting element and lighting element seat to protect the lighting element from moisture.

The lighting system may include separate supports for the lighting element assembly and the collector unit. In one embodiment, the collector unit includes a clip-on clamp, which allows the collector unit to be removably secured to its support. If desired, this allows the collector unit to be removed from its support and attached to another support, such as the support for the lighting element assembly. Advantages of this arrangement include the ability to position the collector unit to optimize its exposure to sunlight and minimize its visual impact in the applicable setting, for example, by inserting its support further into the ground or soil.

As will be readily appreciated from the foregoing summary, the invention provides a robust, weather resistant outdoor lighting system having an ornamental lighting element assembly that may be prominently placed whereas the solar cell and battery providing power thereto are contained within a discreetly positioned collector unit.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
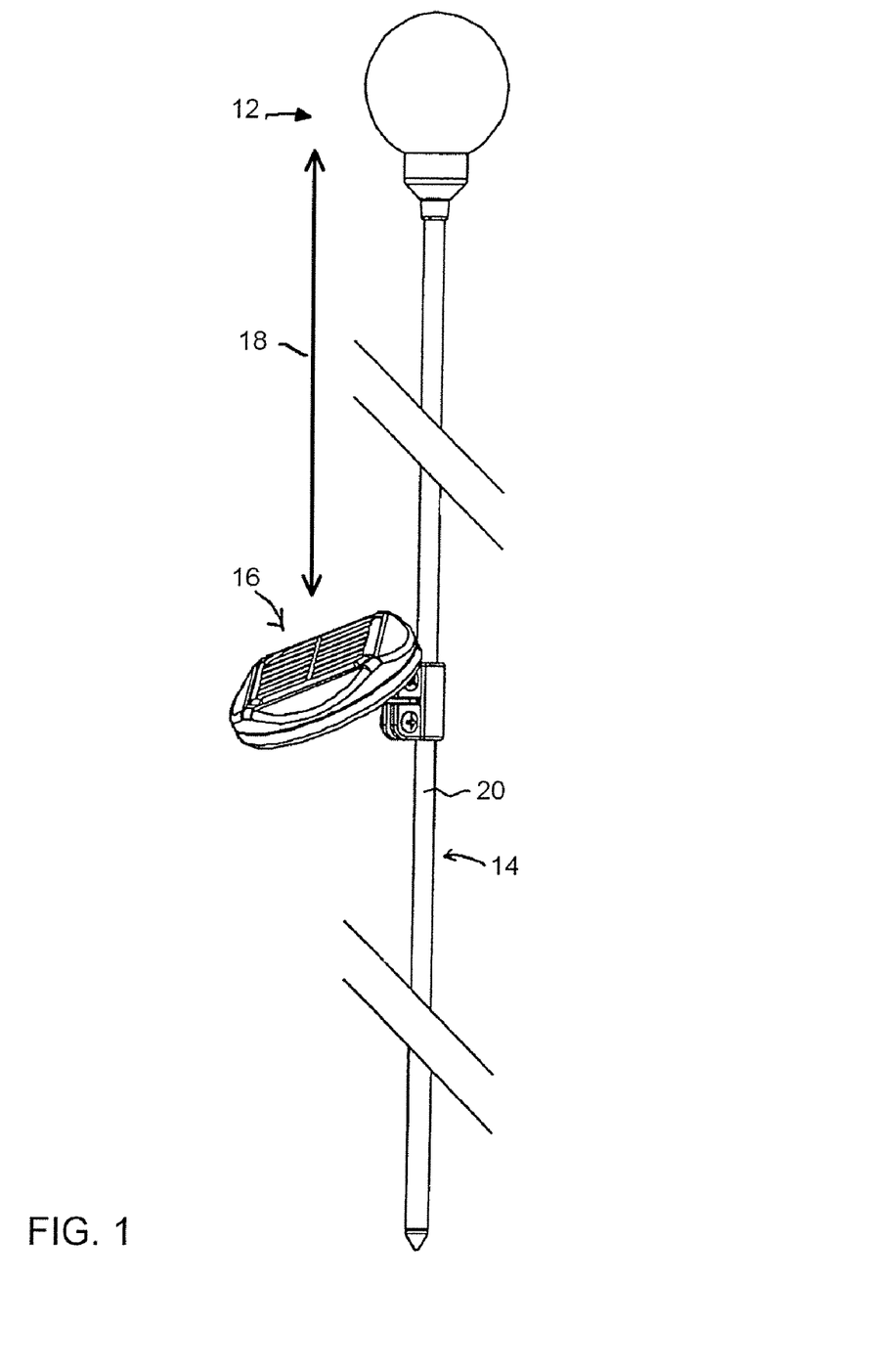
FIG. 1 is a perspective view of a lighting system, in accordance with the present invention.

Referring to FIG. 1, a lighting system 10 may include a lighting element assembly 12, a support 14, and a collector unit 16. The lighting element assembly 12 typically includes a light producing means such as an incandescent lamp or LED. The lighting element assembly 12 secures near the upper end of the support 14 a distance 18 from the collector unit 16. In typical uses, the collector unit 16 will be positioned at or below the upper boundary of foliage and the like in order to minimize its visual impact. The collector unit 16 typically contains a solar cell and a battery, or like means, for collecting and storing solar energy during daylight hours. The solar cell and battery may be integrated in the collector unit 16 or may secure separately to the support 14. Wiring (not shown) connects the lighting element assembly 12 to the collector unit 16.

The support 14 may be straight, curved, or sloped, or have a non-deterministic ornamental shape. In the illustrated embodiment, the support 14 is embodied as a straight rod 20. The rod 20 may be hollow or solid and may have any cross section offering sufficient strength to support the lighting element assembly 12. It may be one monolithic rod or assembled from smaller sections. The sections may be telescoping with fasteners maintaining the sections in place. Alternatively, the sections may thread into one another or secure to one another by threaded connecting pieces. In the illustrated embodiment, the rod 20 is made of stainless steel due to its resistance to weathering; however, aluminum and rigid, weather-resistant plastics such as polycarbonate, polypropylene, or polyvinylchloloride, may also be used.

The lower end of the rod 20 typically inserts into the soil or other substrate and may have a sharpened tip to facilitate insertion. The sharpened tip is either integrally formed with the rod 20 or secured by threads, press-fit, weld, or like attachment means. In other embodiments, the lower end of the rod 20 may be supported by a broad-based stand or other structure that simply rests on the substrate. Such a support mechanism may be used when, for example, the lighting system 10 is placed on a wooden deck or cement patio where insertion is not practicable.

To preserve the aesthetic aspects of the lighting system 10 it may be advantageous to position the collector unit 16 away from the prominent lighting element assembly 12. In the illustrated embodiment, in which the support 14 is embodied as a substantially straight rod 20, the collector unit 16 may secure to the rod 20 such that the distance 18 between itself and the lighting element assembly 12 is equal to about 40 percent or more of the length of the rod 20.

In other embodiments, the support 14 may extend horizontally. Accordingly, the collector unit 16 may be separated a horizontal distance from the lighting element assembly 12 as well as a vertical distance. For example, the support 14 may be embodied as two stakes, one having the lighting element assembly 12 secured thereto and the other having the collector unit 16 secured thereto. Accordingly, the lighting element assembly 12 may be placed prominently whereas the collector unit 16 is placed more discreetly. In addition, the position of the lighting element assembly 12 may be chosen with reference to aesthetics, whereas the position of the collector unit 16 may be chosen based on light conditions.

Figure 2:
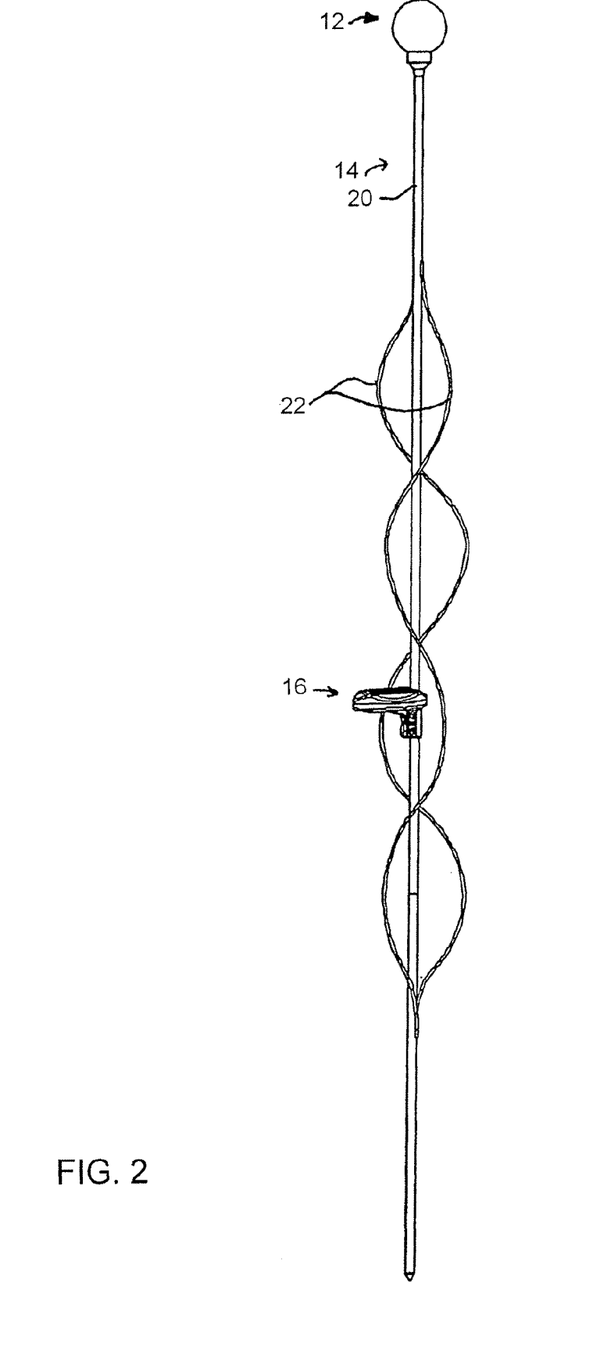
FIG. 2 is a perspective view of an alternative embodiment of a lighting system, in accordance with the present invention.

Referring to FIG. 2, in some embodiments, other ornamental features secure to the support 14. For example, in the embodiment of FIG. 2, wires 22 for facilitating growth of climbing plants secure along the length of the rod 20 in a helical shape. Other features such as hooks for hanging plants, decorative wrought iron, or the like may likewise secure to the rod 20.

Figure 3:
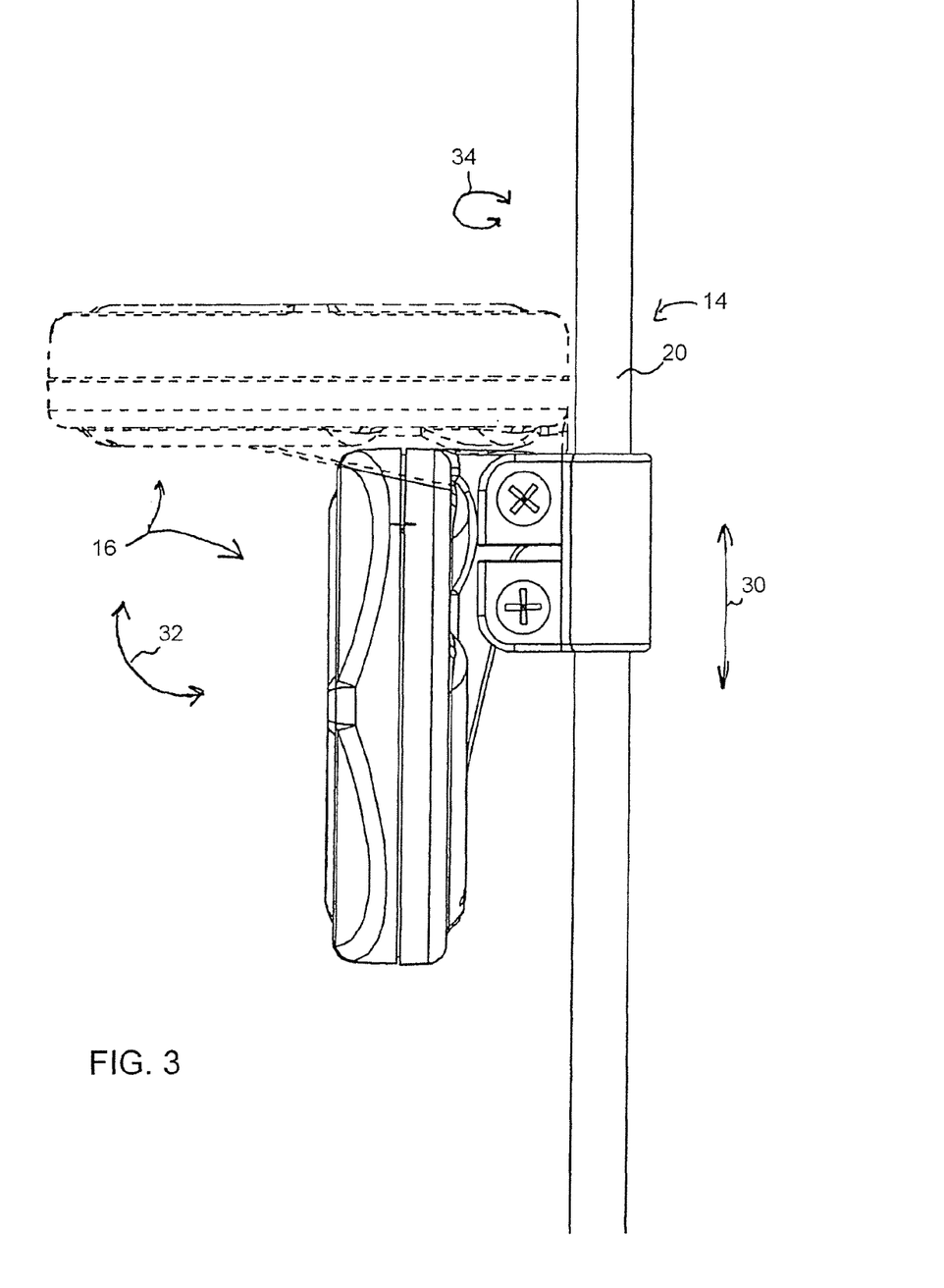
FIG. 3 is a side view of a collector unit, in accordance with the present invention.

Referring to FIG. 3, the collector unit 16 may be adaptable to varying foliage and lighting conditions. For example, in the illustrated embodiment, the location of the collector unit 16 may be adjusted in vertical direction 30. Thus, in high thick foliage, the collector unit 16 may secure higher on the support 14 to increase the amount of sunlight incident thereon. The collector unit 16 may also be rotatable in direction 32 to facilitate both storage and solar power collection. For example, the representation in solid lines is positioned suitable for shipping and storage or for situations where most of the incident light will be horizontally directed. The dotted representation illustrates a deployed position for areas wherein incident light comes generally from above the collector unit 16. The collector unit 16 may also be rotatable in direction 34 about the support 14 to further facilitate proper orientation of the collection unit 16.

Figure 4:
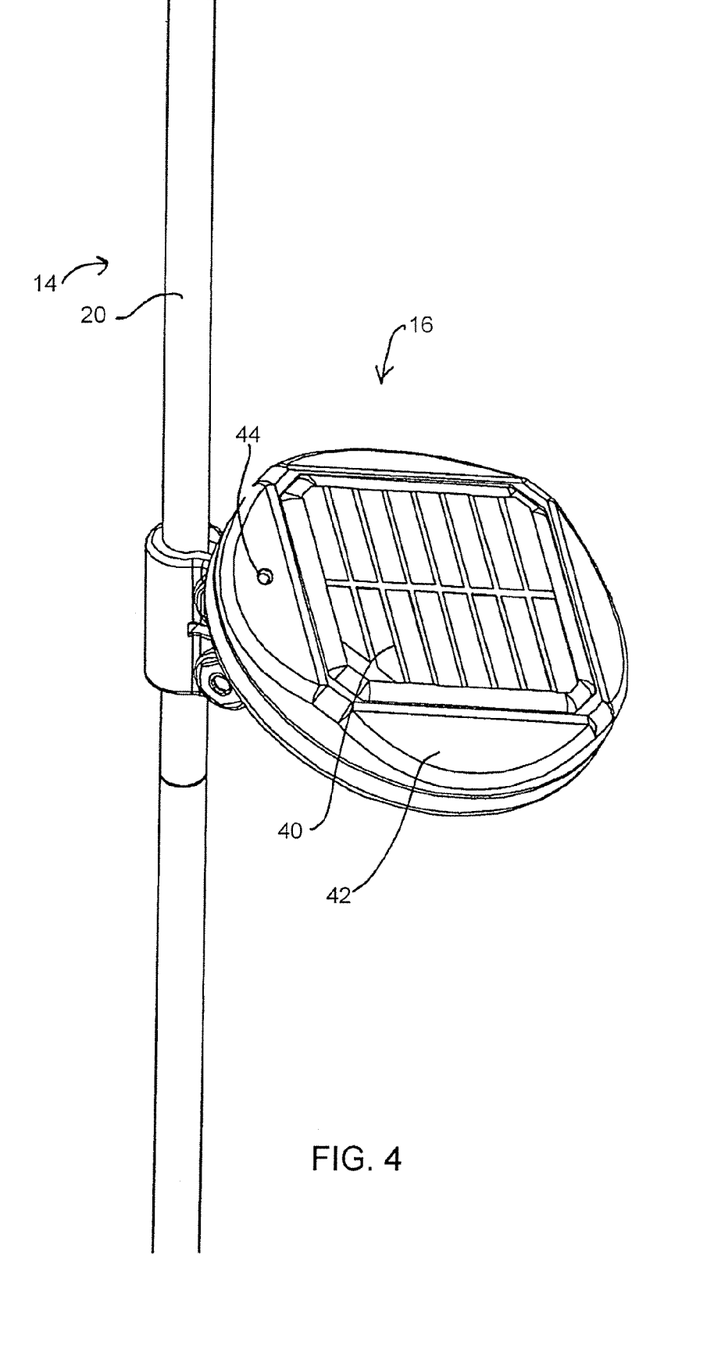
FIG. 4 is an upper quarter perspective view of a collector unit, in accordance with the present invention.

Referring to FIG. 4, the collector unit 16 typically contains a solar cell 40 secured to a housing 42. Batteries may be enclosed by the housing 42 or secure to the support 14 at a different location. A light sensor 44, typically positioned on the same face of the housing 42 as the solar cell 40, serves to automatically close an electrical circuit between the battery and lighting element assembly 12 at low light intensities. In other embodiments, the light sensor 44 is separate from the collector unit 16 and secures separately to the support 14 such as near the lighting element assembly 12 or a substantial distance therefrom. Where the lighting element assembly 12 is separated from the light sensor 44, the light sensor 44 may be less likely to detect light from the lighting element assembly 12 and misinterpret lighting conditions. However, the light from the lighting element assembly 12 may be of insufficient intensity to cause such misinterpretations.

Figure 5:
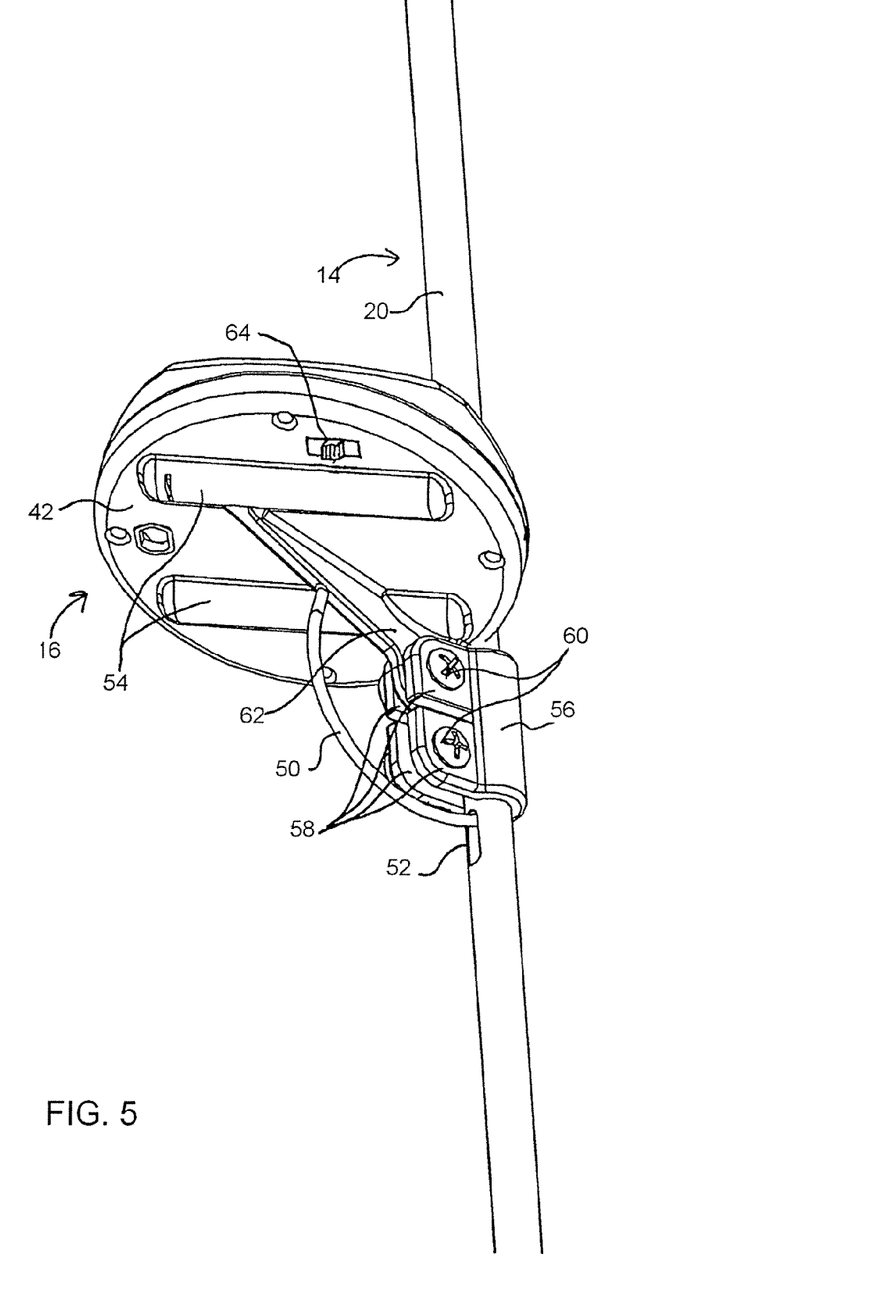
FIG. 5 is a lower quarter perspective view of a collector unit, in accordance with the present invention.

Referring to FIG. 5, a wire 50 typically extends from the collector unit 16 to the lighting element assembly 12. In embodiments of the invention having a support 14 embodied as a hollow rod 20, the wire 50 may be directed through an aperture 52 in the rod 20 and pass through the rod 20 to the lighting element assembly 12. Alternatively, the wire 50 may wrap around the exterior of the support 14. In embodiments having a telescoping rod 20, coiling the wire 50 around the rod 20 enables adjustment in length without interference from the wire 50.

Bays 54 may be formed in the housing 42 to receive batteries for storing electrical energy generated by the solar cell 40 during daylight hours for use in the evening and at night. Alternatively, batteries may be stored in the lighting element assembly 12. In such an embodiment, the wire 50 would connect to the solar cell 40 and carry electrical power to the batteries. In some embodiments, a circuit board resides within the housing 42 and regulates voltage passing to and from the batteries and to the lighting element assembly 12. The circuit board may also receive the output of the light sensor 44 and turn on the lighting element assembly 12 when the output indicates low light levels and turn it off when the output indicates high light levels.

The versatility in positioning and orienting the collector unit 16 may be facilitated by a clamp 56 having a 'U' shape. The arms 58 of the U receive fasteners 60, such as screws, bolts, or the like, which are selectively tightened to secure the clamp 56 to the rod 20. A flange 62 formed in the housing 42 may be positioned between the arms 58 to be clamped thereby. In some embodiments, one of the fasteners 60 also extends through the flange 62, establishing a point of rotation when adjusting the orientation of the collector unit 16. In operation, the fasteners 60 are loosened to permit alteration in the position and orientation of the collector unit 16 and then tightened to prevent further movement. The clamp 56 typically secures to the rod 20 near the aperture 52. In some applications, the clamp 56 secures over the aperture 52 to hinder the entry of contaminants and to make it less visible.

In some embodiments, an on/off switch 64 may secure to the housing 42. The on/off switch 64 is interposed between the batteries and the lighting element assembly 12, enabling a user to optionally turn off the lighting element assembly regardless of the output of the light sensor 44.

Figure 6:
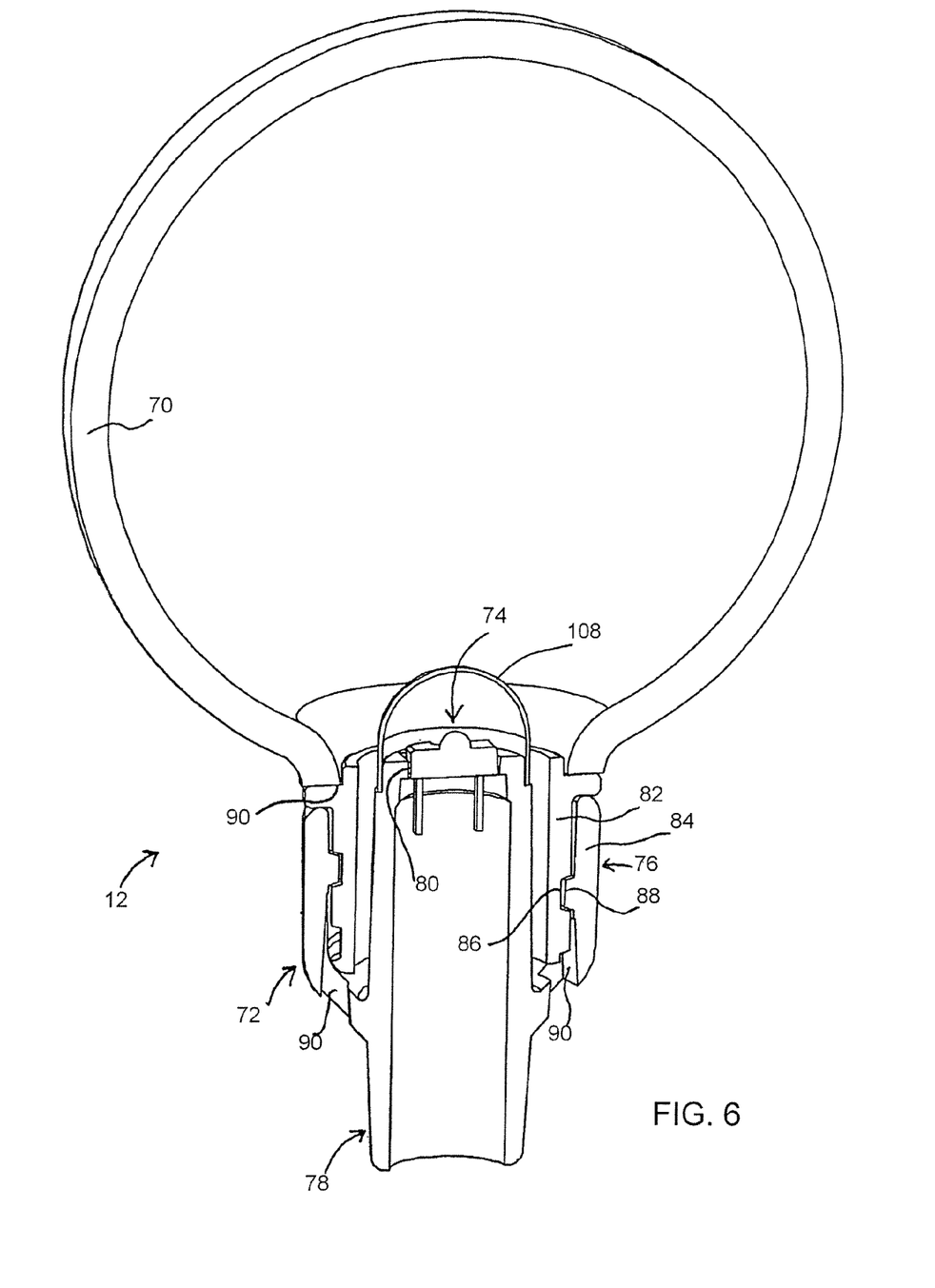
FIG. 6 is a cutaway perspective view of a lighting element assembly, in accordance with the present invention.

Referring to FIG. 6, a lighting element assembly 12 may include a diffuser 70, a support adapter 72, and a lighting element 74. The diffuser 70 typically serves to scatter light from the lighting element 74. It may be embodied as a globe or other three-dimensional shape positionable over the lighting element 74. One or both of the interior and exterior surfaces may be colored, textured, or treated to enhance the diffusing properties of the diffuser 70. In the illustrated embodiment, the diffuser 70 is formed of cracked glass. Cracked glass provides the advantage of concentrating light from the lighting element 74 at many fine cracks formed in the glass, creating a stunning visual effect while maximizing visibility. A lighting element 74 embodied as an LED may have relatively low light output and therefore may benefit from means to increase the visibility of the light therefrom. Where the interior or exterior surfaces are simply frosted, or the like, the light from the lighting element 74 is diffused over a much greater area than cracked glass, resulting in lower visibility.

The support adapter 72 typically includes a diffuser receptacle 76, a support receiver sleeve 78, and a lighting element seat 80. The diffuser receptacle 76 mates with a portion of the diffuser 70 or an attachment 82 secured to the diffuser 70. The diffuser 70 or attachment 82 may fit around the receptacle 76, within the receptacle 76, or rest on a seat formed in the receptacle 76. In the illustrated embodiment, the receptacle 76 is an annular pocket formed by an outer wall 84 circumscribing the lighting element seat 80. The receptacle 76 mates with a tubular attachment 82, or a tubular structure monolithically formed with the diffuser 70, having threads 86 matable with corresponding threads 88 formed on the interior surface of the outer wall 84. The threads 88 may circumscribe the entire wall 84 or be partial threads sufficient to retain the threads 86. Alternatively, the attachment 82 may secure to the receptacle 76 by means of a press-fit or adhesive.

Threaded securement of the diffuser 70 to the diffuser receptacle 76 by means of the attachment 82, or like structure, may enable a user to readily customize the appearance of the lighting system 10. For example, a diffuser 70 matching the flowers currently in season or having a theme matching an upcoming holiday may be readily substituted into the receptacle 76.

Rain, condensation within the diffuser 70, and the like may result in water within the diffuser 70 that may result in discoloration, stains, mineral deposits, or damage to the lighting element 74. Accordingly, apertures 90 may be formed in the receptacle 76, typically in the lower portion thereof. In the illustrated embodiment, the apertures 90 are formed in the lower portion of the outer wall 84. The apertures 90 of FIG. 6 also enable insertion of shims during the manufacturing process to facilitate formation of the threads 88.

The attachment 82 secures to the diffuser 70 by means of adhesive, press-fit, threads, or the like. In the illustrated embodiment, a seat 92 formed near the top of the attachment 82 fits within an opening formed in the diffuser 70. Adhesive placed on the seat 92 secures the diffuser 70 thereto.

The support receiver sleeve 78 typically receives a portion of the upper end of the support 14. In the illustrated embodiment, the rod 20 inserts within the sleeve 78, though in some embodiments the sleeve 78 fits within the rod 20. The rod 20 is secured to the sleeve 78 by adhesive, press-fit, or other like fastening means. The sleeve 78 typically extends through the support adapter 72 to the lighting element seat to provide a channel for receiving the wire 50.

Figure 7:
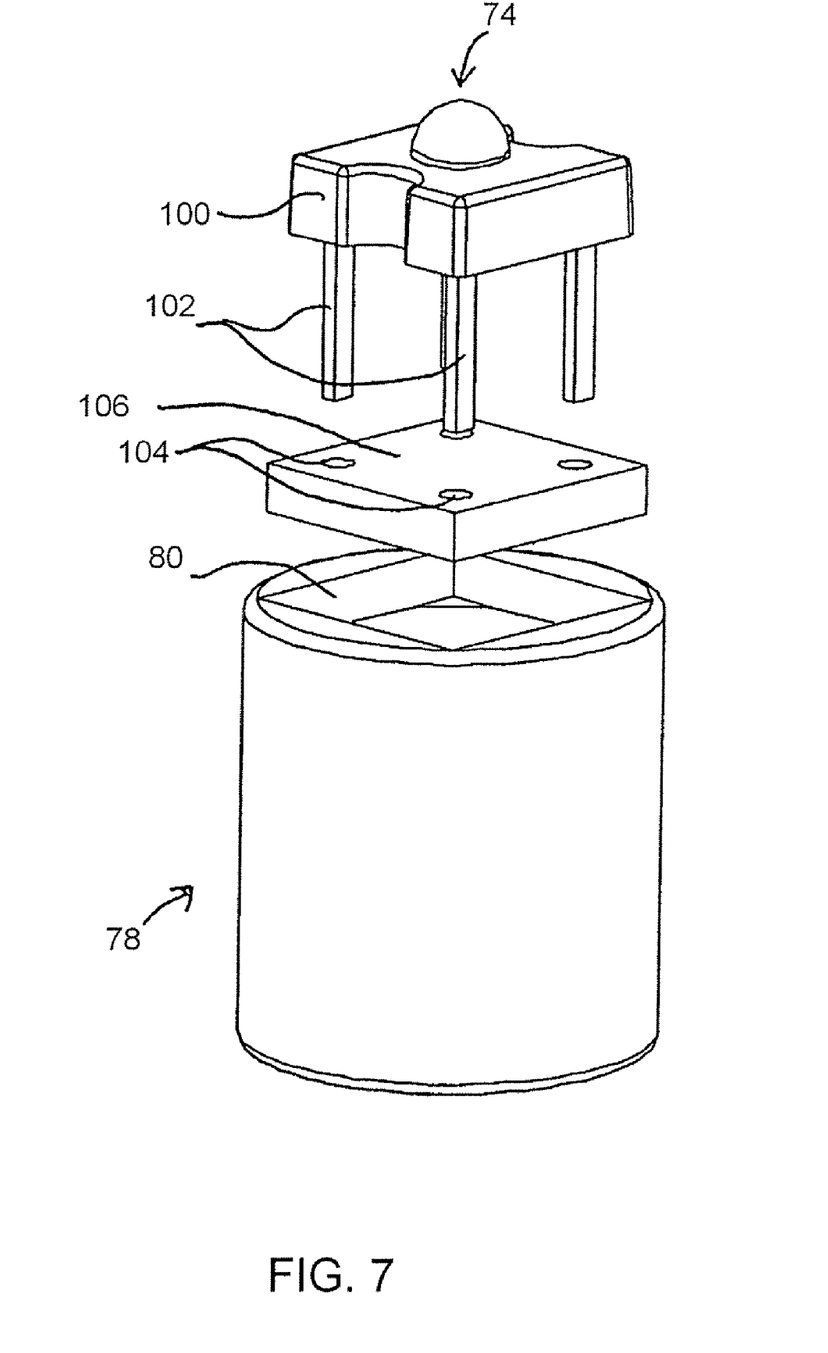
FIG. 7 is an exploded view of a LED mounting system, in accordance with the present invention.

Referring to FIG. 7, while still referring to FIG. 6, in the illustrated embodiment, the lighting element seat 80 receives a lighting element 74 embodied as an LED circuit board 100 having an LED mounted thereon. The LED may be amber, or any other color output by LED's. In some embodiments, phosphorescent coating over the LED results in light having wavelengths other than those output by the LED. The circuit board 100 typically has leads 102 extending therefrom. The leads 102 extend through apertures 104 formed in an LED mount plate 106. The mount plate 106 secures within the lighting element seat 80 by means of adhesive or a like securement means. In typical applications, the wire 50 will be connected to the leads 102 prior to securing the mount plate 106 to the lighting element seat 80. The lighting element seat 80 typically opens into the support receiver sleeve 78, providing a channel through the support adapter 72 to receive the wire 50. A lighting element shield 108 (as shown in FIG. 6), such as a transparent dome, may then be placed over the lighting element 74 to protect against weathering. In the illustrated embodiment, the shield 108 fits around the lighting element 74 and lighting element seat 80 and is secured by either adhesive or press-fit. In some embodiments, the shield 108 extends downwardly to near the point of attachment of the outer wall 84 to the support adapter 72 to provide additional protection.

Figure 8:
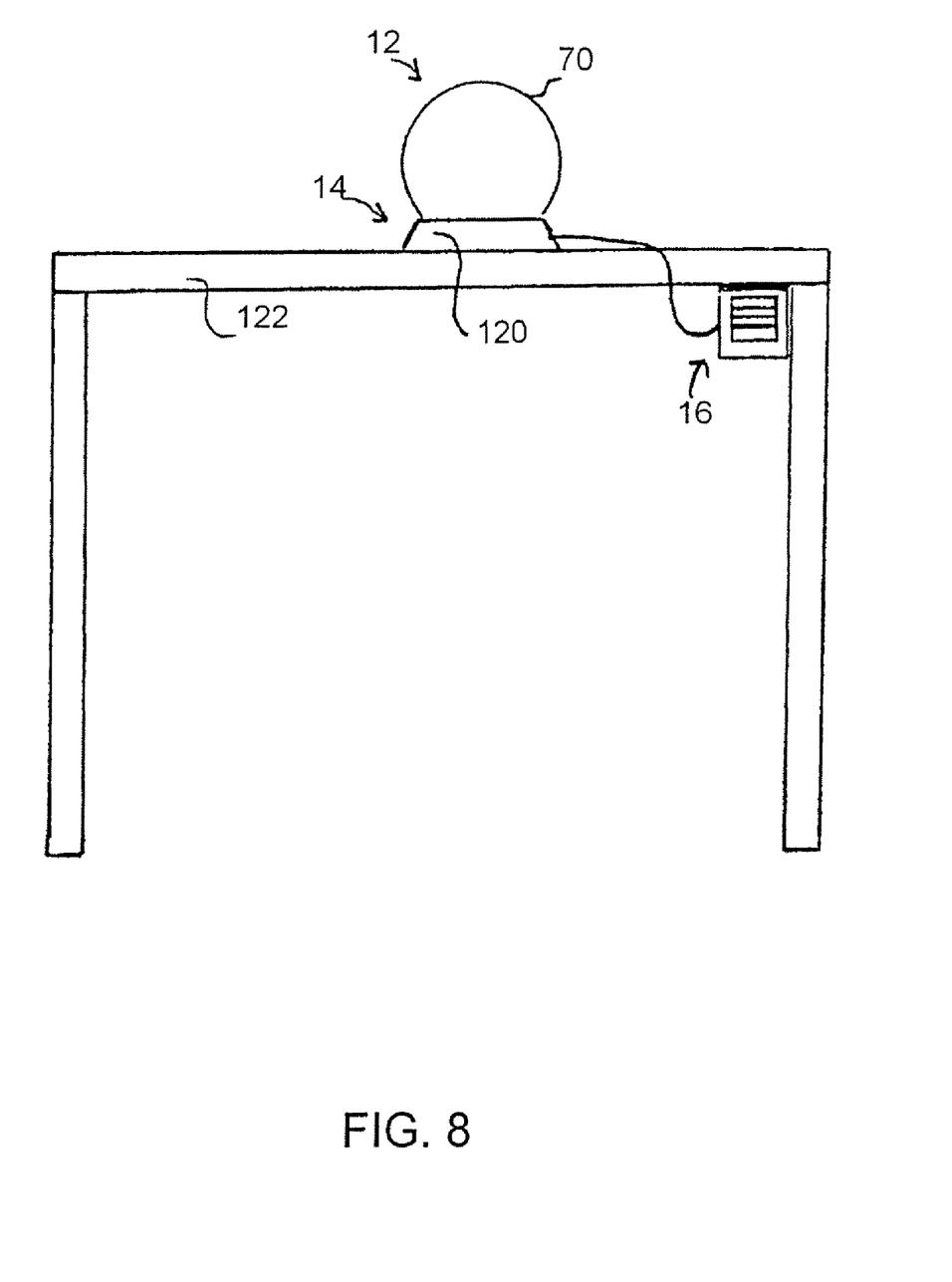
FIG. 8 is a side view of a lighting system having a support adapted for placement on a flat surface.

Referring to FIG. 8, in some embodiments the support 14 may be embodied as a stand 120 or base 120 supporting the lighting element assembly 12 or integrally formed with the lighting element assembly 12. In such embodiments, the collector unit 16 may secure to a structure other than the support 14 such as a table 122 supporting the base 120. The wiring 50 is typically of sufficient length to extend from the collector unit 16 to the lighting element assembly 12. The collector unit may be positioned discretely on the table 122 or other support structure. For example, the collector unit may secure to the underside of the table 122 by means of VELCRO or to the legs of the table 122 by straps, or the like.

Figure 9:
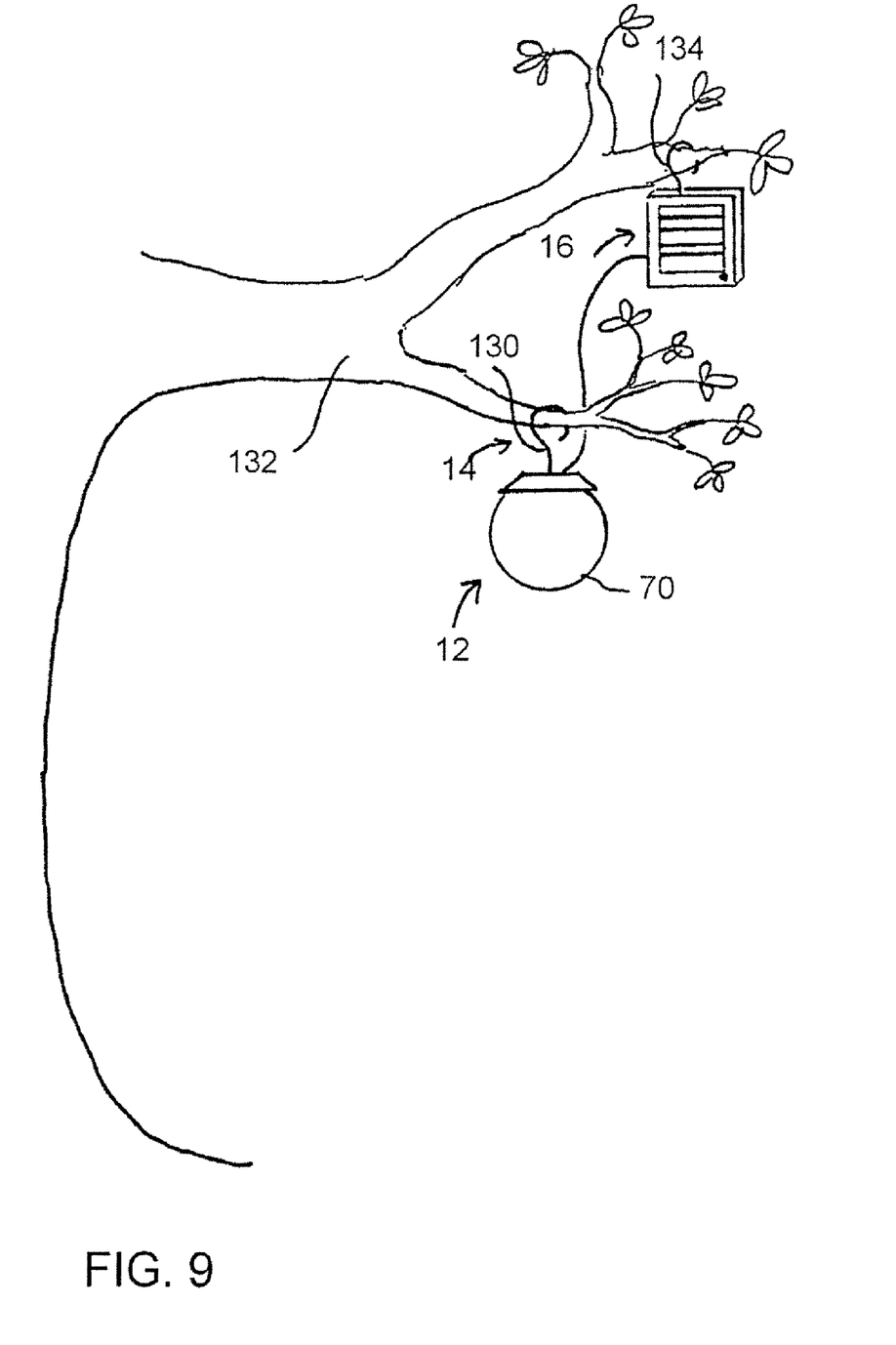
FIG. 9 is a front view of a lighting system having a support adapted to suspend the lighting element assembly from a support structure.
Figure 10:
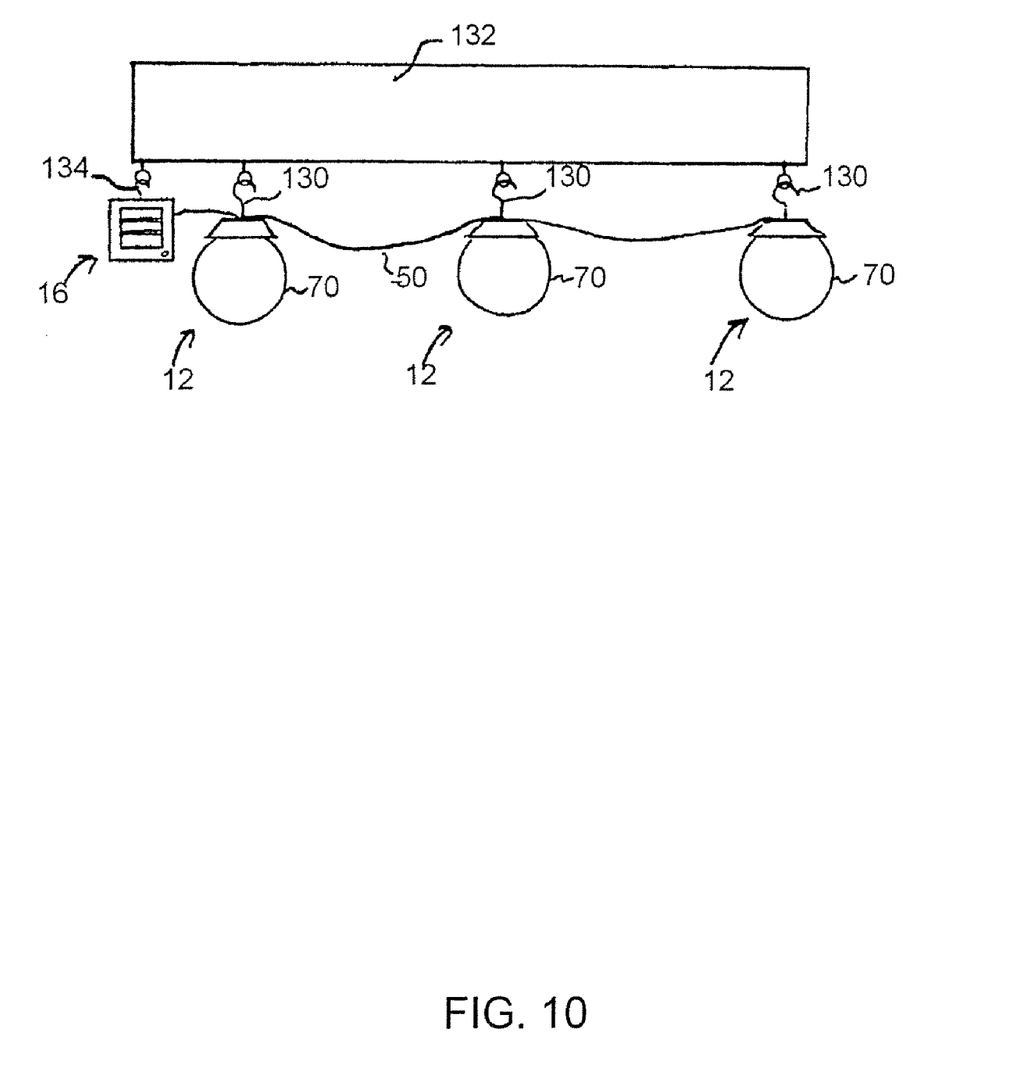
FIG. 10 is a front view of a lighting system having multiple suspending lighting element assemblies.

Referring to FIGS. 9 and 10, in other embodiments, the support 14 is embodied as hooks 130 suspending the lighting element assembly 12 from a support structure 132 such as a tree branch or the eave of a house. The collector unit 16 may likewise secure to the support structure by means of a hook 134 or like fastener. In typical applications, the collector unit 16 will be positioned away from the lighting element assembly 12. Multiple lighting element assemblies 12 each suspended from a hook 130 may be coupled by wiring 50 to a single collector unit 16, as illustrated in FIG. 10. The diffuser 70 in such embodiments may be a paper lantern common in some Asian and Latin American cultures.

Figure 11:
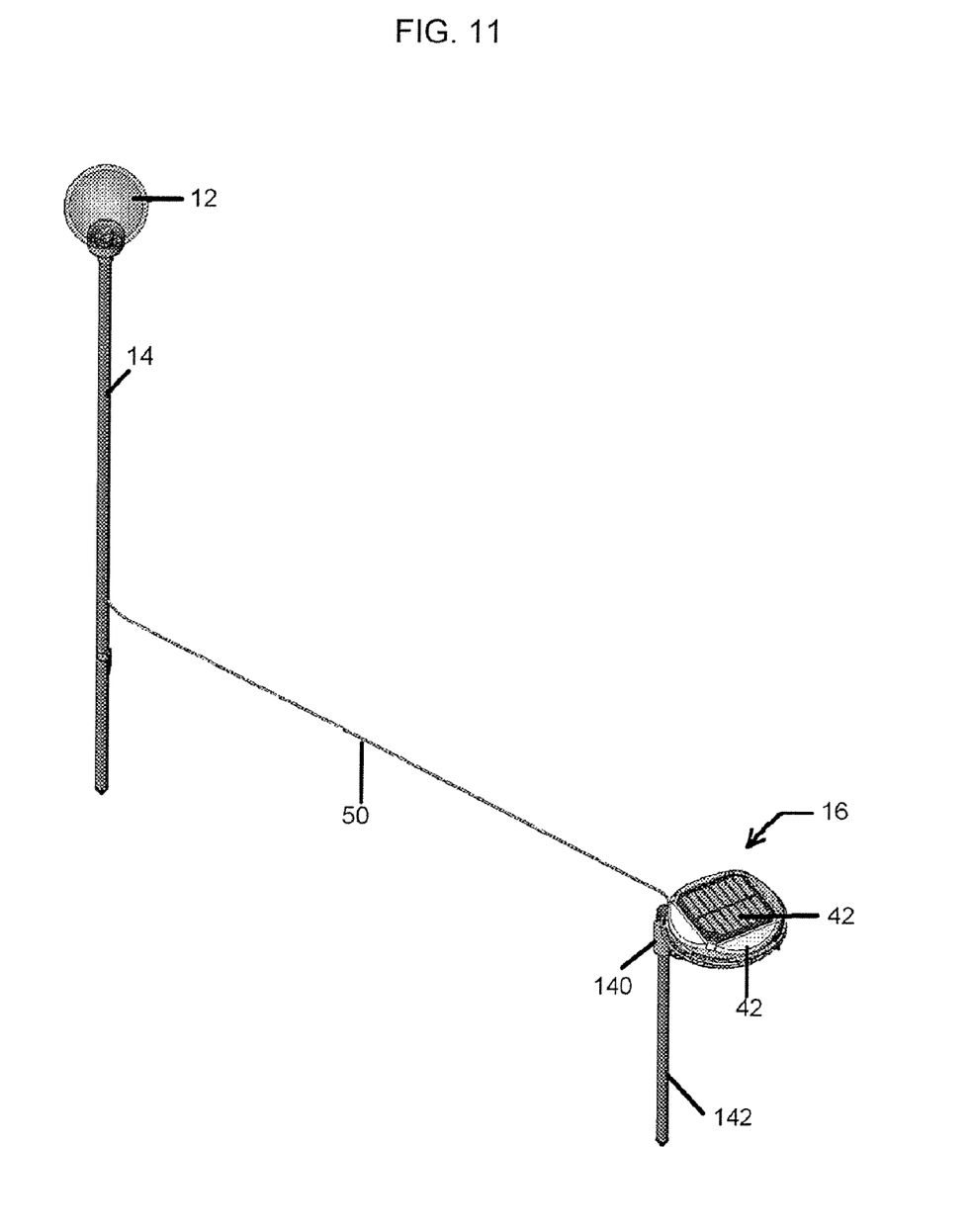
FIG. 11 is a perspective view of an alternate embodiment of a lighting system of the present invention in which the collector unit is positioned remotely from the lighting element assembly.

Referring to FIG. 11, an isometric view of an alternate embodiment of a lighting system of the present invention is shown in which the collector unit 16 is positioned remotely from the lighting element assembly 12. As set forth above, the lighting element 12 secures to the upper end of a support 14 with the lower end of the support 14 being supported by a substrate, such as the ground or soil. As set forth above, the collector unit 16 preferably includes the solar cell 40, the housing 42 and the battery (not shown), which is electrically coupled to the lighting element assembly 12 with the wire 50. In this alternate embodiment, the collector unit 16 includes a coupler in the form of a clip-on clamp 140, which allows the collector unit 16 to be removably attached to a second support 142 separate from the support 14 for the lighting element assembly 12, thereby allowing the collector unit 16 to be positioned remotely from the lighting element assembly 12. The collector unit may alternatively include just the solar cell with the battery positioned elsewhere, such as in support 14 or the lighting element assembly 12. The second support 142 has similar characteristics to the support 14, as set forth above. The lower end of the second support 142 is supported by a substrate. The clip-on clamp 140 of the collector unit 16 provides great flexibility and allows the collector unit 16 to be easily removed from the second support 142 and, if desired, attached to another support, such as the support 14 for the lighting element assembly 12. As set forth above, in typical uses, the collector unit 16 will be positioned at or below the upper boundary of foliage and the like, or away from the main foliage, in order to minimize its visual impact while the lighting element assembly 12 will be positioned above the upper boundary of foliage and the like for visability. Advantages of this arrangement include the ability to position the collector unit 16 to optimize its exposure to sunlight and minimize its visual impact in the applicable setting, for example, by inserting the second support 142 further into the substrate, such as the ground or soil.

Figure 12:
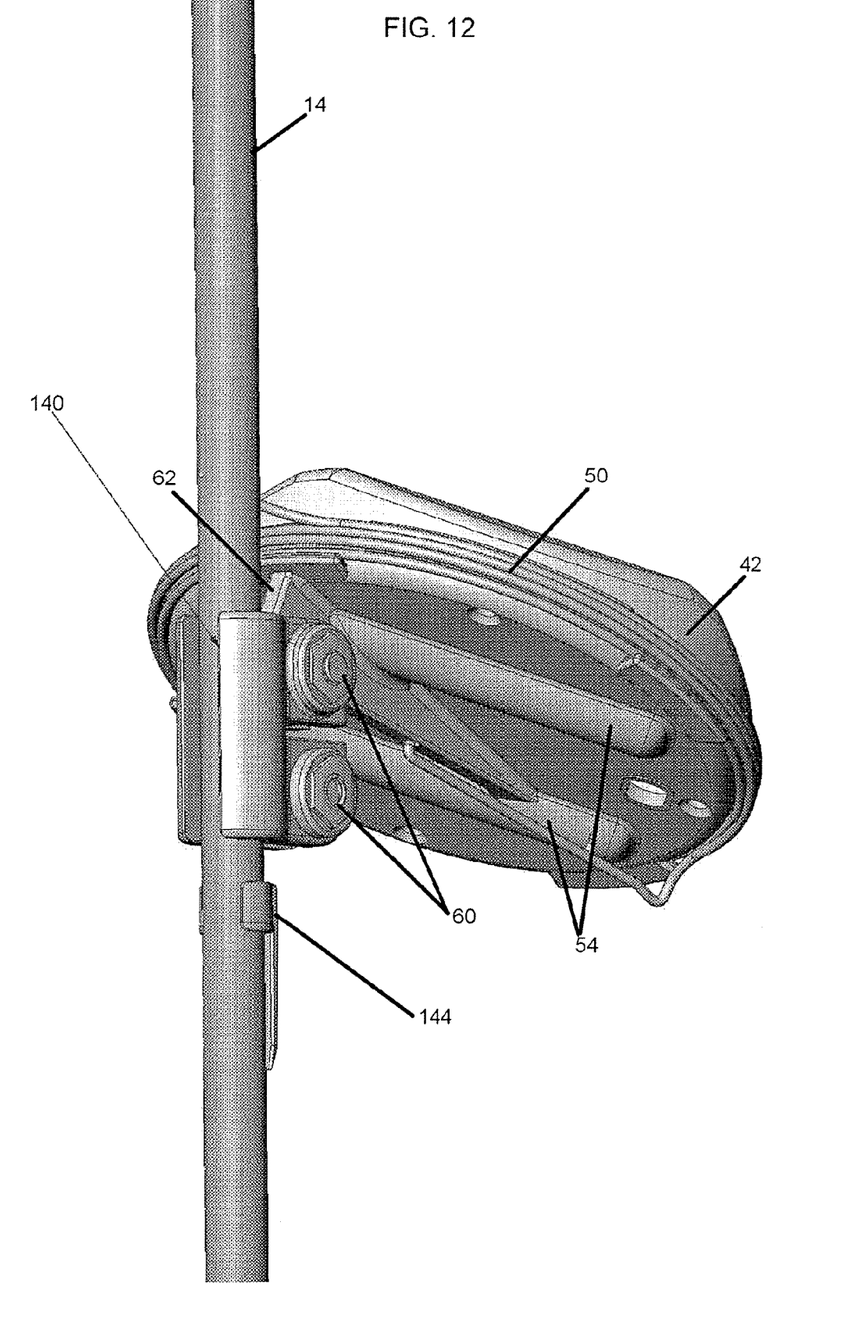
FIG. 12 is a lower perspective view of an alternate embodiment of a lighting system of the present invention in which the collector unit has a clip-on clamp.

Referring to FIG. 12, a lower perspective view of the alternate embodiment of a lighting system of the present invention is shown in which the collector unit 16 has the clip-on clamp 140. In this embodiment, the collector unit 16 is attached using the clip-on clamp 140 to the support 14 for the lighting element assembly 12, rather than to the second support 142 as shown in FIG. 1l. As set forth above, the collector unit 16 includes the housing 42, the bays 54 for receiving batteries, the fasteners 60 for securing the collector unit 16 to the support 14, the flange 62 formed in the housing 42 for attaching the clip-on clamp 140 to the housing 42 and the wire. As set forth, the collector unit 16 may optionally include the light sensor 44 and the on/off switch 64. As set forth above, the clip-on clamp 140 of the collector unit 16 allows the collector unit 16 to be easily removed from the support 14 and, if desired, attached to another support. The wire 50 in this embodiment is wrapped around the outside of the housing 42. In order to connect the collector unit 16 with the lighting element assembly 12, the wire 50 is unwrapped from the housing such that only the desired amount of wire 50 is used. Alternatively, housing 42 may include a post or posts on the bottom around which the wire 50 may be wrapped. In another embodiment, the wire 50 can be included within, or attached to, the housing 42 and dispensed from a retraction device. This embodiment also includes a tool 144 capable of being clipped to the support 14 or the second support 142 which is adapted for disconnecting the batteries from the collector unit 16.

While the preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows.

The invention claimed is:

1. A lighting system comprising:
a lighting element assembly;
a collector unit which comprises a solar cell and a coupler, wherein the coupler allows the collector unit to be selectively attached to a desired support;
a first support having an upper end and a lower end, the lighting element assembly secured proximate the upper end, the lower end being supported by a substrate;
a second support having an upper end and a lower end, the collector unit being removably, selectively and rotatably secured to the second support using the coupler; and
a battery electrically coupled to the solar cell of the collector unit and to the lighting element assembly using a wire, wherein that portion of the wire that extends from the collector unit to the lighting element assembly is of sufficient length to allow the collector unit to be selectively positioned on or remotely from the first support.

2. The lighting system of claim 1 wherein the collector unit houses the battery.

3. The lighting system of claim 1, wherein the lower end of the second support is supported by a substrate.

4. The lighting system of claim 1, wherein the first support and the second support are substantially straight.

5. The lighting system of claim 1 wherein the collector unit further comprises fasteners for securing the collector unit to a support in a plurality of positions.

6. The lighting system of claim 1 wherein the coupler is a clip-on clamp.

7. The lighting system of claim 6 wherein the wire is wrapped around at least a portion of the collector unit.

8. A method for using an outdoor lighting system comprising:
providing a lighting element assembly;
providing a collector unit which comprises a solar cell, a battery and a clip-on clamp, wherein the battery is electrically coupled to the solar cell of the collector unit and to the lighting element assembly;
providing a first support having an upper end and a lower end, the lighting element assembly securing proximate the upper end;
providing a second support having an upper end and a lower end, the collector unit being removably secured to the second support using the clip-on clamp; and
positioning the second support remotely from the first support.

9. The method of claim 8 wherein positioning of the first and second supports comprises insertion of a portion of the lower ends of the first and second supports into a substrate.

10. The method of claim 8 wherein the lighting element assembly is disposed a substantial distance above the upper portions of at least a portion of foliage elements.

11. A lighting system comprising:
a lighting element assembly;
a collector unit which comprises a solar cell, a battery and a clip-on clamp, wherein the battery is electrically coupled to the solar cell of the collector unit and to the lighting element assembly;

a first support having an upper end and a lower end, the lighting element assembly securing proximate the upper end and the lower end being supported by a substrate; and a second support having an upper end and a lower end, the collector unit being removably secured to the second support using the clip-on clamp and the lower end of the second support being supported by the substrate.

12. The lighting system of claim 11, wherein the first support and the second support are substantially straight.

13. The lighting system of claim 11 wherein the collector unit further comprises fasteners for securing the collector unit to a support in a plurality of positions.

14. The lighting system of claim 11, wherein the collector unit selectively and rotatably secures to the second support.

15. The lighting system of claim 11 further comprising a wire to electrically couple the battery to the solar cell of the collector unit and to the lighting element assembly.

16. The lighting system of claim 15 wherein the wire is wrapped around the exterior of the collector unit.

17. The lighting system of claim 15 further comprising a refraction device for holding the wire.

* * * * *